United States Patent [19]

Meyer

[11] Patent Number: 5,674,046
[45] Date of Patent: Oct. 7, 1997

[54] MULTIPLE CONSTRUCTION EQUIPMENT ATTACHMENT

[76] Inventor: Robert D. Meyer, 4017 S. Clement Ave. #102, Milwaukee, Wis. 52307

[21] Appl. No.: 562,056

[22] Filed: Nov. 22, 1995

[51] Int. Cl.⁶ .................................................. E02F 9/00
[52] U.S. Cl. ........................... 414/686; 414/723; 37/468
[58] Field of Search ............................ 414/686, 703, 414/912, 723; 37/403, 408, 405, 407, 468; 172/246, 272–275

[56] References Cited

U.S. PATENT DOCUMENTS

| | | | |
|---|---|---|---|
| 4,850,789 | 7/1989 | Zimmerman | 414/912 X |
| 5,026,247 | 6/1991 | Zimmerman | 414/703 |
| 5,064,338 | 11/1991 | Lawrence | 37/403 X |
| 5,419,673 | 5/1995 | Merhar | 37/468 X |

*Primary Examiner*—Donald W. Underwood

[57] ABSTRACT

A multiple construction equipment attachment comprised of a vehicle mount having an upper end, a lower end, and two side portions. The vehicle mount is securable to a front end of a vehicle. The upper end has a slot formed therethrough. The slot has a release handle extending upwardly therethrough. The two side portions each have a securement bolt extending outwardly thereof downwardly of the upper end. Each securement bolt is pivotally coupled with the release handle. Each securement bolt selectively extends outwardly of the two side portions in relationship with the positioning of the release handle. A hydraulic ram is secured to the lower end of the vehicle mount. The hydraulic ram is controlled from within the vehicle. Two securement bars each have a securement portion extending backwardly therefrom. Each securement portion is removably secured to the securement bolt of the two side portions of the vehicle mount. Each of the securement bars has an elongated recess formed therein. A forklift portion is securable to the two securement bars. A hydraulic front end loader portion is securable to the vehicle mount. A snow plow portion is securable to the two securement bars.

5 Claims, 4 Drawing Sheets

MULTIPLE CONSTRUCTION EQUIPMENT ATTACHMENT

BACKGROUND OF THE INVENTION

1. Field of the Invention

The present invention relates to a multiple construction equipment attachment and more particularly pertains to allowing a vehicle to be used to serve as a snow plow, a front end loader, and a fork lift with a multiple construction equipment attachment.

2. Description of the Prior Art

The use of hitch attachments is known in the prior art. More specifically, hitch attachments heretofore devised and utilized for the purpose of allowing attachments of various implements are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,290,133 to Riley discloses a bale handling apparatus and carriage.

U.S. Pat. No. 5,257,797 to Johnson discloses a tractor hitch.

U.S. Pat. No. 5,245,769 to Wammock discloses a trencher for mounting on a tractor.

U.S. Pat. No. 5,178,505 to Smith discloses a three-point hitch attachment with hay mover.

U.S. Pat. No. 5,178,511 to Wedin discloses an axially mounted implement carriers.

While these devices fulfill their respective, particular objective and requirements, the aforementioned patents do not describe a multiple construction equipment attachment for allowing a vehicle to be used to serve as a snow plow, a front end loader, and a fork lift.

In this respect, the multiple construction equipment attachment according to the present invention substantially departs from the conventional concepts and designs of the prior art, and in doing so provides an apparatus primarily developed for the purpose of allowing a vehicle to be used to serve as a snow plow, a front end loader, and a fork lift.

Therefore, it can be appreciated that there exists a continuing need for new and improved multiple construction equipment attachment which can be used for allowing a vehicle to be used to serve as a snow plow, a front end loader, and a fork lift. In this regard, the present invention substantially fulfills this need.

SUMMARY OF THE INVENTION

In the view of the foregoing disadvantages inherent in the known types of hitch attachments now present in the prior art, the present invention provides an improved multiple construction equipment attachment. As such, the general purpose of the present invention, which will be described subsequently in greater detail, is to provide a new and improved multiple construction equipment attachment and method which has all the advantages of the prior art and none of the disadvantages.

To attain this, the present invention essentially comprises a vehicle mount having an upper end, a lower end, and two side portions. The vehicle mount is securable to a front end of a vehicle. The upper end has a slot formed therethrough. The slot has a release handle extending upwardly therethrough. The two side portions each has a securement bolt extending outwardly thereof downwardly of the upper end. Each securement bolt is pivotally coupled with the release handle. Each securement bolt selectively extends outwardly of the two side portions in relationship with the positioning of the release handle. A hydraulic ram is secured to the lower end of the vehicle mount. The hydraulic ram has a control means within the vehicle. The device contains two securement bars. Each of the two securement bars has a securement portion extending backwardly therefrom. Each securement portion is removably secured to the securement bolt of the two side portions of the vehicle mount. Each of the securement bars has an elongated recess formed therein. The device contains a forklift portion having two side supports extending upwardly therefrom. The two side supports have a securement rod therebetween. The two side supports are removably secured between each elongated recess of the two securement bars with the securement rod coupled with the hydraulic ram of the vehicle mount. The device contains a hydraulic front end loader portion having two pivoting side supports extending outwardly therefrom. The two pivoting side supports are removably secured to the securement bolt of the two side portions of the vehicle mount. A lower portion of the two pivoting side supports have a cross bar therebetween. The cross bar is removably secured to the hydraulic ram of the vehicle mount. The device contains a snow plow portion having a securement portion extending outwardly therefrom. The securement portion has two apertures formed therethrough. The snow plow portion has a securement platform. The platform has a plurality of apertures formed therethrough. The securement portion is adjustably secured to the securement platform through the aligning respective apertures thereof by fastening means. The securement platform has two side supports extending upwardly therefrom. The two side supports have a securement rod therebetween. The two side supports are removably secured between each elongated recess of the two securement bars with the securement rod coupled with the hydraulic ram of the vehicle mount.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved multiple construction equipment attachment which has all the advantages of the prior art hitch attachments and none of the disadvantages.

It is another object of the present invention to provide a new and improved multiple construction equipment attachment which may be easily and efficiently manufactured and marketed.

It is a further object of the present invention to provide a new and improved multiple construction equipment attachment which is of durable and reliable construction.

An even further object of the present invention is to provide a new and improved multiple construction equipment attachment which is susceptible of a low cost of manufacture with regard to both materials and labor, and which accordingly is then susceptible of low prices of sale to the consuming public, thereby making such a multiple construction equipment attachment economically available to the buying public.

Still yet another object of the present invention is to provide a new and improved multiple construction equipment attachment which provides in the apparatuses and methods of the prior art some of the advantages thereof, while simultaneously overcoming some of the disadvantages normally associated therewith.

Even still another object of the present invention is to provide a new and improved multiple construction equipment attachment for allowing a vehicle to be used to serve as a snow plow, a front end loader, and a fork lift.

Lastly, it is an object of the present invention to provide a new and improved multiple construction equipment attachment comprised of a vehicle mount having an upper end, a lower end, and two side portions. The vehicle mount is securable to a front end of a vehicle. The upper end has a slot formed therethrough. The slot has a release handle extending upwardly therethrough. The two side portions each have a securement bolt extending outwardly thereof downwardly of the upper end. Each securement bolt is pivotally coupled with the release handle. Each securement bolt selectively extends outwardly of the two side portions in relationship with the positioning of the release handle. A hydraulic ram is secured to the lower end of the vehicle mount. The hydraulic ram has a control means within the vehicle. Two securement bars each have a securement portion extending backwardly therefrom. Each securement portion is removably secured to the securement bolt of the two side portions of the vehicle mount. Each of the securement bars has an elongated recess formed therein. A forklift portion is securable to the two securement bars. A hydraulic front end loader portion is securable to the vehicle mount. A snow plow portion is securable to the two securement bars.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
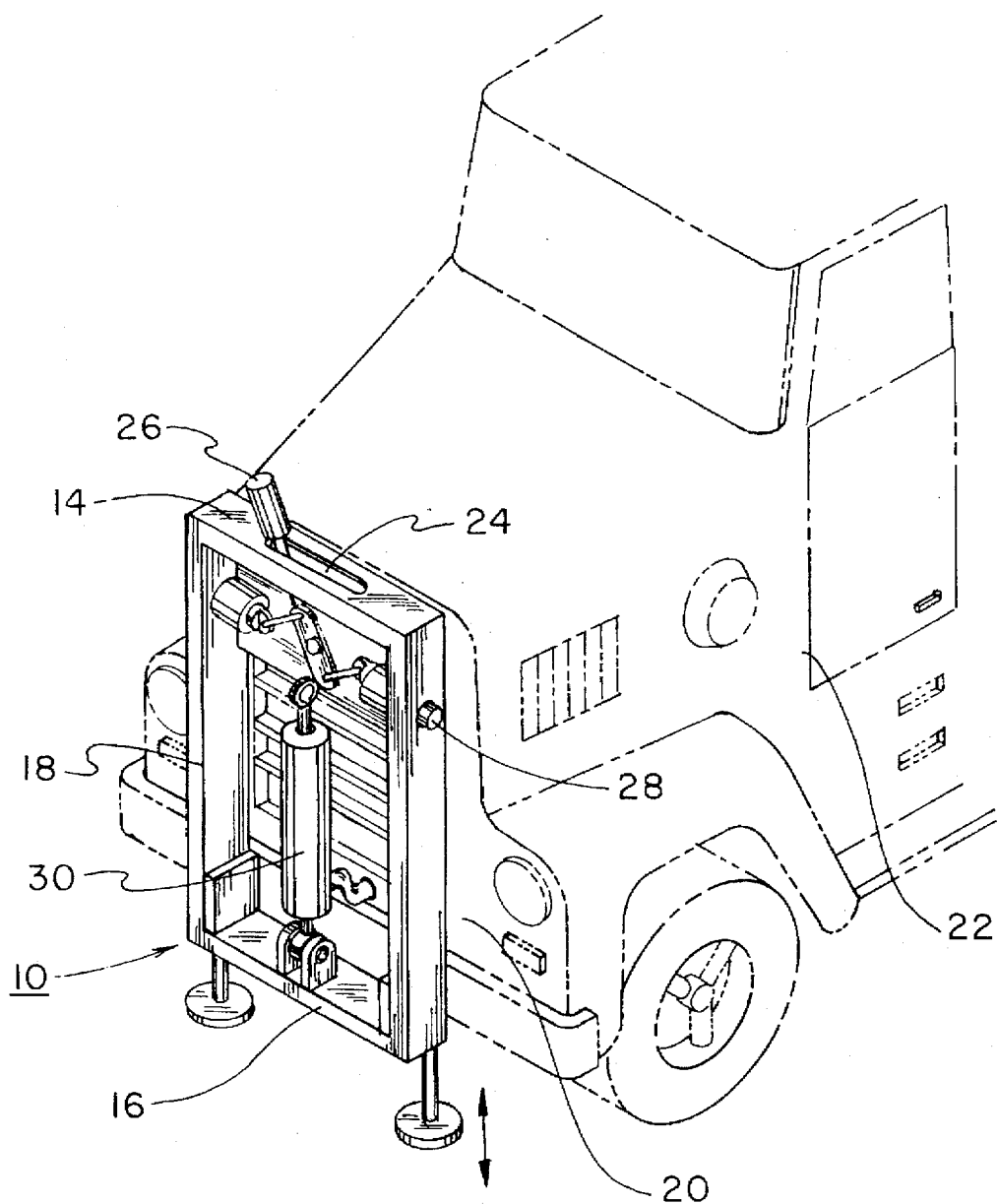
FIG. 1 is a perspective view of the preferred embodiment of the multiple construction equipment attachment constructed in accordance with the principles of the present invention.
Figure 2:
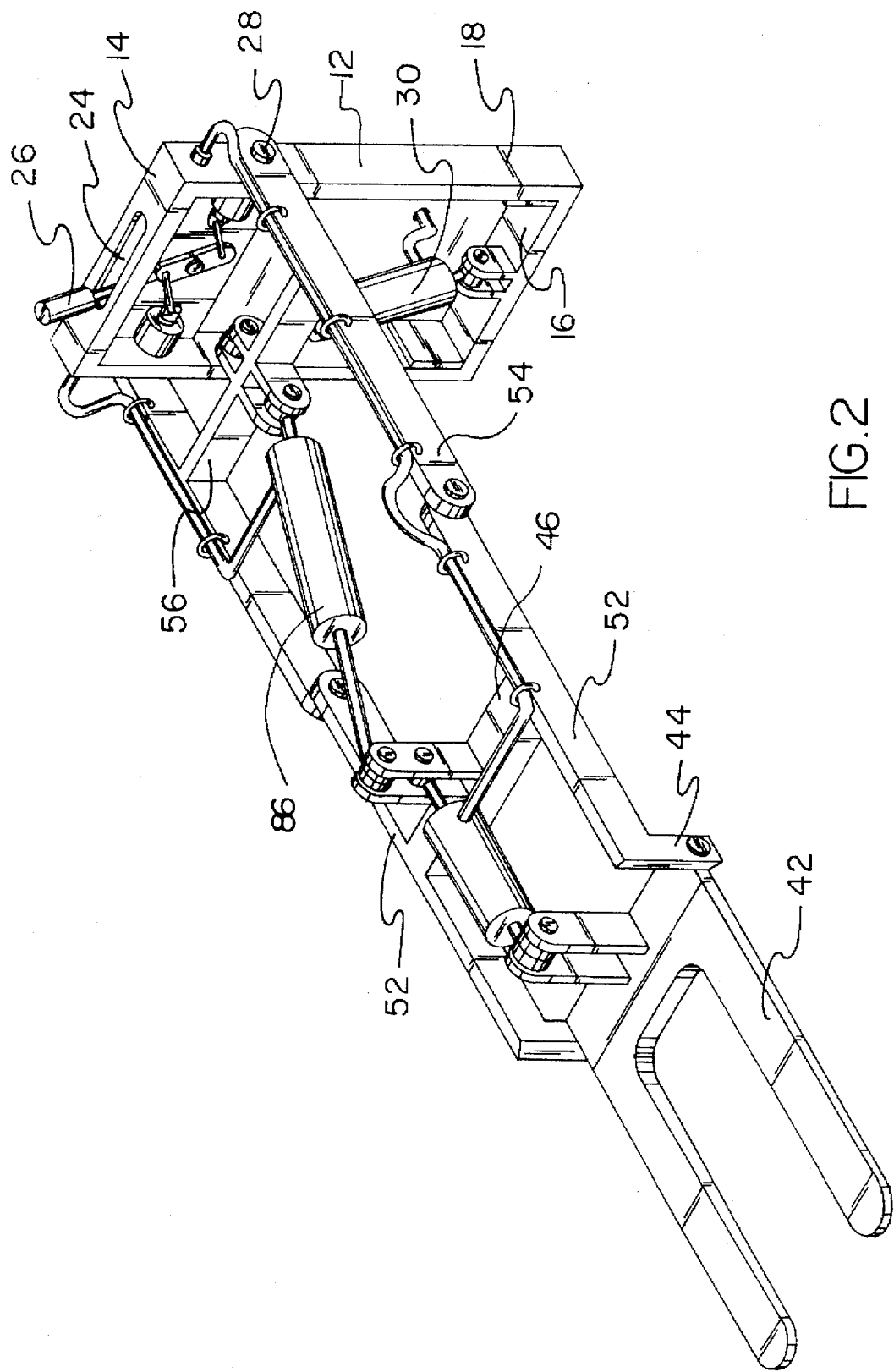
FIG. 2 is a perspective view of the present invention with the fork lift attachment.
Figure 3:
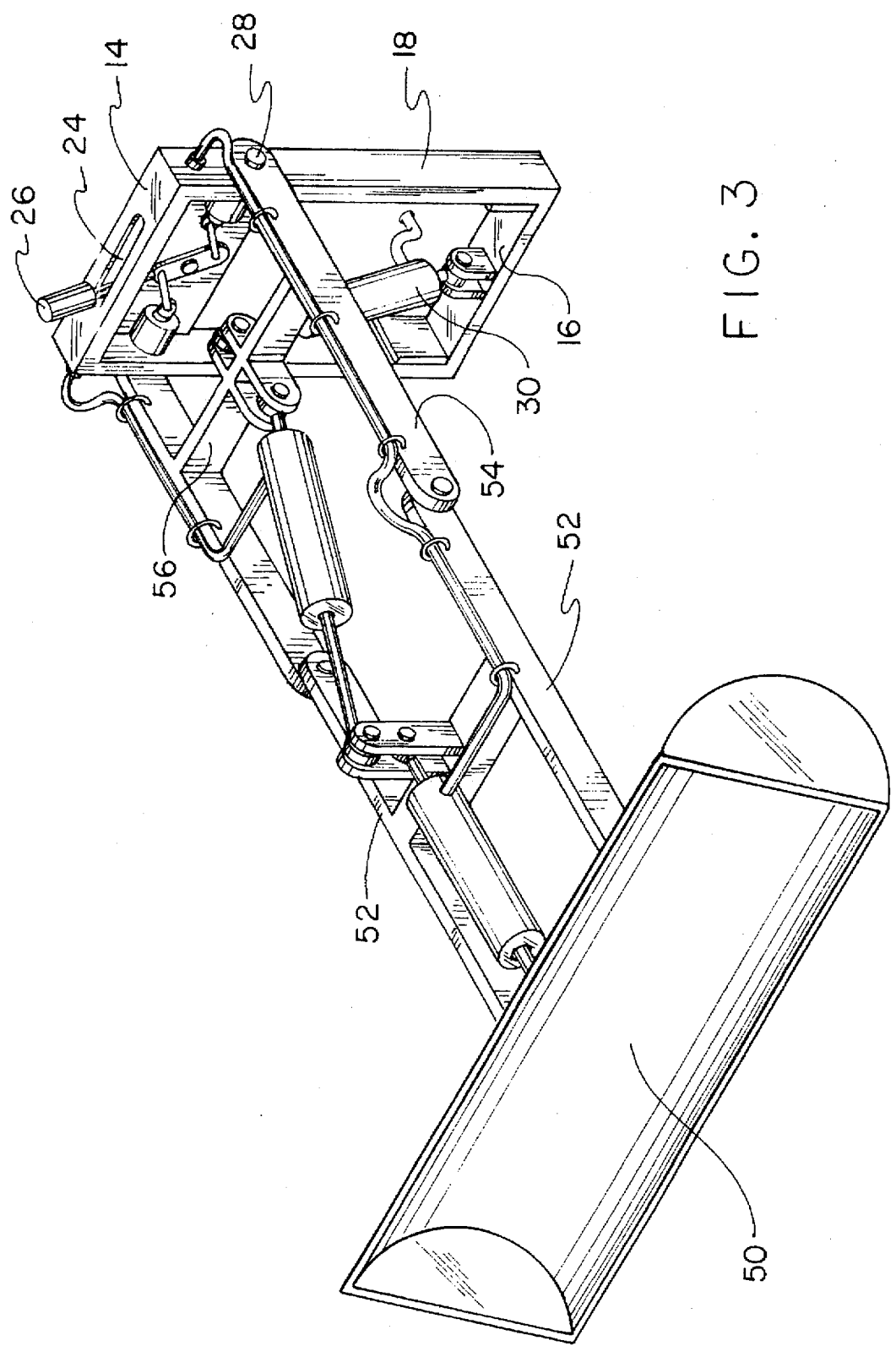
FIG. 3 is a perspective view of the present invention with the front end loader attachment.
Figure 4:
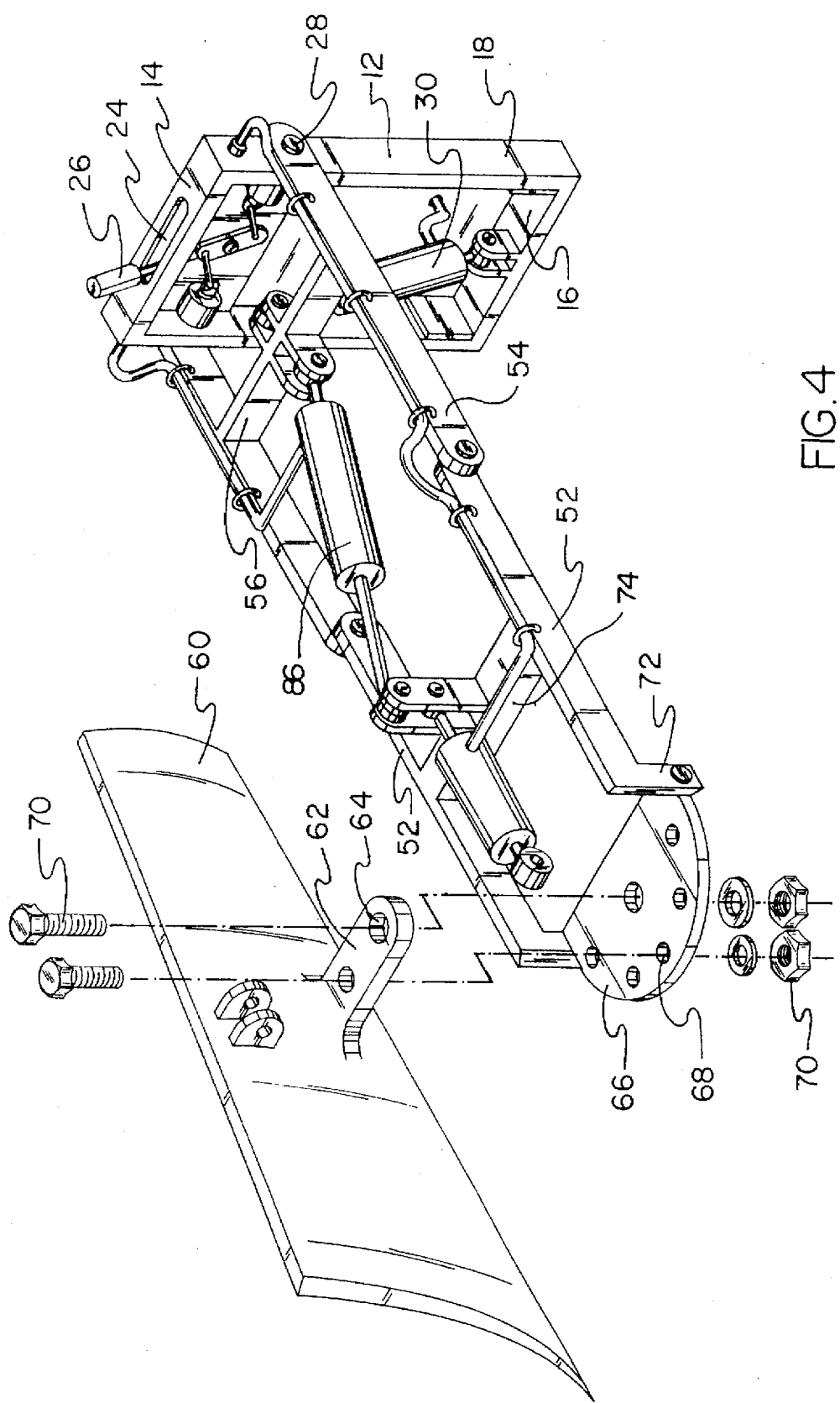
FIG. 4 is a perspective, semi-exploded view of the snow plow attachment of the present invention.

With reference now to the drawings, and in particular, to FIG. 1 thereof, the preferred embodiment of the new and improved multiple construction equipment attachment embodying the principles and concepts of the present invention and generally designated by the reference number 10 will be described.

Specifically, it will be noted in the various Figures that the device relates to a new and improved multiple construction equipment attachment for allowing a vehicle to be used to serve as a snow plow, a front end loader, and a fork lift. In its broadest context, the device consists of a vehicle mount, two securement bars, a forklift portion, a front end loader portion, and a snow plow portion.

The device 10 contains a vehicle mount 12 having an upper end 14, a lower end 16, and two side portions 18. The vehicle mount 12 is securable to a front end 20 of a vehicle 22. The upper end 14 has a slot 24 formed therethrough. The slot 24 has a release handle 26 extending upwardly therethrough. The two side portions 18 each has a securement bolt 28 extending outwardly thereof downwardly of the upper end 14. Each securement bolt 28 is pivotally coupled with the release handle 26. Each securement bolt 28 selectively extends outwardly of the two side portions 18 in relationship with the positioning of the release handle 26. A hydraulic ram 30 is secured to the lower end 16 of the vehicle mount 12. The hydraulic ram 30 has a control means within the vehicle 22. The control means (not illustrated) is a standard control mechanism used in hydraulics. The vehicle mount 12 can be made to be a permanent addition to the front end 20 of the vehicle 22.

The device 10 contains a forklift portion 42 having two side supports 44 extending upwardly therefrom. The two side supports 44 are secured to two pivoting side supports 52 which has a securement rod 46 coupled with a second hydraulic ram 89. The two pivoting side supports 52 having lower portions 54. The lower portions 54 of the two pivoting side supports 52 have a cross bar 56 therebetween. The cross bar 56 is removably secured to the hydraulic ram 30 of the vehicle mount 12 and to the second hydraulic ram. The hydraulic ram 30 will control the manipulation of the forklift portion 42 from within the vehicle 22.

The device 10 contains a hydraulic front end loader 50 portion having two pivoting side supports 52 extending outwardly therefrom. The two pivoting side supports 52 have lower portions 54. The lower portions 54 of the two pivoting side supports 52 have a cross bar 56 therebetween. The cross bar 56 is removably secured to the hydraulic ram 30 of the vehicle mount 12.

The device 10 contains a snow plow portion 60 having a securement portion 62 extending outwardly therefrom. The securement portion 62 has two apertures 64 formed therethrough. The snow plow portion 60 has a securement platform 66. The platform 66 has a plurality of apertures 68 formed therethrough. The securement portion 62 is adjustably secured to the securement platform 66 through the aligning respective apertures 64,68 thereof by fastening means 70. The angle of the snow plow portion 60 can be altered by removing the fastening means 70 and repositioning the securement portion 62 in relation to the plurality of apertures 68 of the securement platform 66. The securement platform 66 has two side supports 72 extending upwardly therefrom. The two side supports 72 are secured to two pivoting side supports 52 with a securement rod 74 extending therebetween and coupled with a second hydraulic ram. The two pivoting side supports 52 have lower portions 54. The lower portions 54 are to removably secured to the two side portions 18 of the vehicle mount 12. The lower portion 54 of the two pivoting side supports 52 have a cross bar 56 therebetween. The cross bar 56 is removably secured to the hydraulic ram 30 of the vehicle mount 12 and to the second hydraulic ram. The hydraulic ram 30 will control the manipulation of the snow plow portion 60 from within the vehicle 22.

The present invention is a basic attachment system mounted on trucks that accepts at least three types of accessories to serve as a snow plow, a front end loader, and a fork lift.

The unit would have a universal mount permanently attached on the vehicle to which any of the devices can be installed. A central hydraulic unit incorporated into the vehicle contains the oil reservoir, pump, filters, pressure relief valve, control valves within the truck cab, high pressure hoses and quick connect coupling for rapid hook-up, perhaps an oil cooler and the like. All components utilize the same mounting pins and hardware, and can withstand rugged use and provide long life. Hydraulic cylinders may be incorporated into the vehicle suspension system to prevent movement under the load when in use.

The accessories can be stored on pallets, enabling the truck to be driven up and attached with a minimum of effort, without the need of other facilities. After use, they can be lowered on pallets and disengaged from the basic mount.

This invention will allow one vehicle to be used for all three purposes. It involves one truck with the basic mount and accessories, rather than three separate vehicles equipped with each service. The savings that result should be very significant, making it very appealing to private contractors and public works groups.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A multiple construction equipment attachment for allowing a vehicle to be used to serve as a snow plow, a front end loader, and a fork lift comprising, in combination:

a vehicle mount having an upper end, a lower end, and two side portions, the vehicle mount securable to a front end of a vehicle, the upper end having a slot formed therethrough, the slot having a release handle extending upwardly therethrough, the two side portions each having a securement bolt extending outwardly thereof downwardly of the upper end, each securement bolt pivotally coupled with the release handle, each securement bolt selectively extending outwardly of the two side portions in relationship with the positioning of the release handle, a hydraulic ram secured to the lower end of the vehicle mount, the hydraulic ram controllable from within the vehicle;

a forklift portion having two first side supports extending upwardly therefrom, the two first side supports coupled to two first pivoting side supports, the two first pivoting side supports having a first securement rod therebetween with the first securement rod coupled with a second hydraulic ram, the two first pivoting side supports being pivotally coupleable by the securement bolts to the two side portions of the vehicle mount, a lower portion of the two first pivoting side supports having a first cross bar therebetween, the first cross bar being removably securable to the hydraulic ram of the vehicle mount and the second hydraulic ram;

a hydraulic front end loader portion having two second pivoting side supports extending outwardly therefrom, the two second pivoting side supports pivotally coupleable by the securement bolts to the two side portions of the vehicle mount, a lower portion of the two second pivoting side supports having a second cross bar therebetween, the second cross bar removably securable to the hydraulic ram of the vehicle mount;

a snow plow portion having a securement portion extending outwardly therefrom, the securement portion having two apertures formed therethrough, the snow plow portion having a securement platform, the platform having a plurality of apertures formed therethrough, the securement portion adjustably secured to the securement platform through the aligning respective apertures thereof by fastening means, the securement platform having two second side supports extending upwardly therefrom, the two second side supports coupled to two third pivoting side supports, the two third pivoting side supports having a second securement rod therebetween with the second securement rod coupleable with a third hydraulic ram, the two third pivoting side supports being pivotally coupleable by the securement bolts to the two side portions of the vehicle mount, a lower portion of the two pivoting side supports having a second cross bar therebetween, the second cross bar being removably securable to the hydraulic ram of the vehicle mount and the third hydraulic ram.

2. A multiple construction equipment attachment for allowing a vehicle to be used to serve as a snow plow, a front end loader, and a fork lift comprising, in combination:

a vehicle mount having an upper end, a lower end, and two side portions, the vehicle mount securable to a front end of a vehicle, the upper end having a slot formed therethrough, the slot having a release handle extending upwardly therethrough, the two side portions each having a securement bolt extending outwardly thereof downwardly of the upper end, each securement bolt pivotally coupled with the release handle, each securement bolt selectively extending outwardly of the two side portions in relationship with the positioning of the release handle, a hydraulic ram secured to the lower end of the vehicle mount, the hydraulic ram controllable from within the vehicle;

a forklift portion securable to the vehicle mount;

a hydraulic front end loader portion securable to the vehicle mount;

a snow plow portion securable to the vehicle mount.

3. The attachment as described in claim 2 wherein the forklift portion having two side supports extending upwardly therefrom, the two side supports coupled to two pivoting side supports, the two pivoting side supports having a securement rod therebetween with the securement rod coupled with a second hydraulic ram, the two pivoting side supports being pivotally coupleable by the securement bolts to the two side portions of the vehicle mount, a lower portion of the two pivoting side supports having a cross bar therebetween, the cross bar being removably secured to the hydraulic arm of the vehicle mount and the second hydraulic ram.

4. The attachment as described in claim 2 wherein the hydraulic front end loader portion having two pivoting side supports extending outwardly therefrom, the two pivoting side supports pivotally coupleable by the securement bolts to the two side portions of the vehicle mount, a lower portion of the two pivoting side supports having a cross bar therebetween, the cross bar removably secured to the hydraulic ram of the vehicle mount.

5. The attachment as described in claim 2 wherein the snow plow portion having a securement portion extending outwardly therefrom, the securement portion having two apertures formed therethrough, the snow plow portion having a securement platform, the platform having a plurality of apertures formed therethrough, the securement portion adjustably secured to the securement platform through the aligning respective apertures thereof by fastening means, the securement platform having two side supports extending upwardly therefrom, the two side supports pivotally coupled to two pivoting side supports, the two pivoting side supports having a securement rod therebetween with the securement rod coupled with a second hydraulic ram, the two pivoting side supports being pivotally coupleable by the securement bolts to the two side portions of the vehicle mount, a lower portion of the two pivoting side supports having a cross bar therebetween, the cross bar being removably securable to the hydraulic ram of the vehicle mount and the second hydraulic arm.

* * * * *